(12) United States Patent
Bhat

(10) Patent No.: US 11,097,638 B2
(45) Date of Patent: Aug. 24, 2021

(54) ADJUSTING DEVICE FOR LONGITUDINAL ADJUSTMENT OF A VEHICLE SEAT AND METHOD FOR MANUFACTURING THE SAME

(71) Applicant: Brose Fahrzeugteile GmbH & Co. KG, Coburg, Coburg (DE)

(72) Inventor: Anil Bhat, Rochester Hills, MI (US)

(73) Assignee: Brose Fahrzeugteile SE & Co. KG (Coburg), Coburg (DE)

( * ) Notice: Subject to any disclaimer, the term of this patent is extended or adjusted under 35 U.S.C. 154(b) by 285 days.

(21) Appl. No.: 16/361,270

(22) Filed: Mar. 22, 2019

(65) Prior Publication Data

US 2020/0298733 A1  Sep. 24, 2020

(51) Int. Cl.
*B60N 2/07* (2006.01)
*B33Y 50/00* (2015.01)
*B33Y 80/00* (2015.01)

(52) U.S. Cl.
CPC .......... *B60N 2/0722* (2013.01); *B33Y 50/00* (2014.12); *B33Y 80/00* (2014.12); *B60N 2/0715* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,863,289 A | * | 9/1989 | Lecerf | B60N 2/0705 384/47 |
| 6,059,248 A | * | 5/2000 | Bauer | B60N 2/0705 248/429 |
| 7,758,008 B2 | * | 7/2010 | Kojima | B60N 2/0825 248/430 |
| 8,033,520 B2 | * | 10/2011 | Fujieda | B60N 2/0727 248/430 |

(Continued)

OTHER PUBLICATIONS

BECHEM_Berucoat_MC_anti-friction_coatings_03 (download on Mar. 20, 2019) (https://www.bechem.dei/fileadmin/downloads/BECHEM_Berucoat_MC_anti-friction_coatings_03.pdf ).

*Primary Examiner* — Monica E Millner
(74) *Attorney, Agent, or Firm* — Renner, Otto, Boisselle & Sklar, LLP

(57) ABSTRACT

Methods for enhancing the sliding performance of an adjusting device for longitudinal adjustment of a vehicle seat are disclosed. The adjusting device comprises a first rail and a second rail movably guided relative to the first rail. Friction-reducing members are disposed between the two rails in a bearing area. The geometry and dimensions of the friction-reducing members are precisely adjusted in accordance with the geometry and dimensions of the two rails in the bearing areas, which are measured separately. The friction-reducing members may be produced using additive manufacturing technology, with a geometry and dimensions precisely in accordance with the geometry and dimensions of the two rails. The friction-reducing members may also be produced using conventional injection molding, whereas the geometry (Continued)

A-A and dimensions of the friction-reducing members are adjusted subsequently by varying the thickness of friction-reducing layers or coatings applied to outer surfaces of the friction-reducing members using e.g. ablative techniques.

16 Claims, 6 Drawing Sheets

(56) References Cited

U.S. PATENT DOCUMENTS

| | | | | |
|---|---|---|---|---|
| 8,172,192 | B2* | 5/2012 | Hofmann | B60N 2/0715 |
| | | | | 248/429 |
| 9,731,629 | B2* | 8/2017 | Yamada | B60N 2/0715 |
| 9,738,180 | B2* | 8/2017 | Ioppolo | F16C 33/3887 |
| 10,160,350 | B2* | 12/2018 | Ioppolo | B60N 2/0705 |
| 10,279,706 | B2* | 5/2019 | Harris | B60N 2/0722 |
| 10,486,556 | B2* | 11/2019 | Ioppolo | B60N 2/0705 |
| 2004/0084926 | A1 | 5/2004 | Muller et al. | |
| 2007/0158987 | A1* | 7/2007 | Hayakawa | B60N 2/0705 |
| | | | | 297/344.11 |
| 2012/0074289 | A1* | 3/2012 | Kimura | F16C 29/04 |
| | | | | 248/430 |
| 2015/0314704 | A1* | 11/2015 | Suck | B60N 2/0875 |
| | | | | 248/430 |
| 2016/0263837 | A1 | 9/2016 | Goldman et al. | |
| 2016/0263838 | A1 | 9/2016 | Goldman et al. | |
| 2016/0325493 | A1 | 11/2016 | DeSimone et al. | |
| 2018/0009335 | A1* | 1/2018 | Laugt | G01L 1/044 |
| 2018/0086233 | A1 | 3/2018 | Harris et al. | |
| 2019/0368390 | A1* | 12/2019 | Cornell | F01L 3/10 |

\* cited by examiner

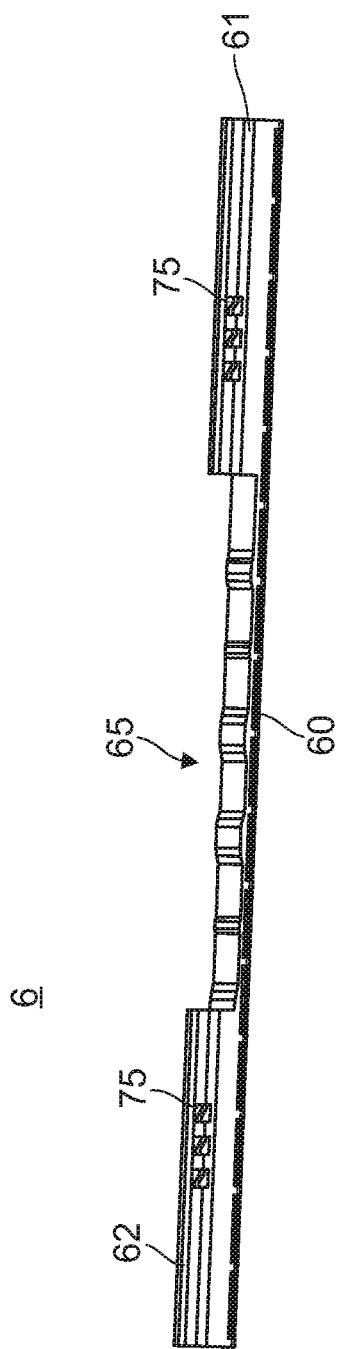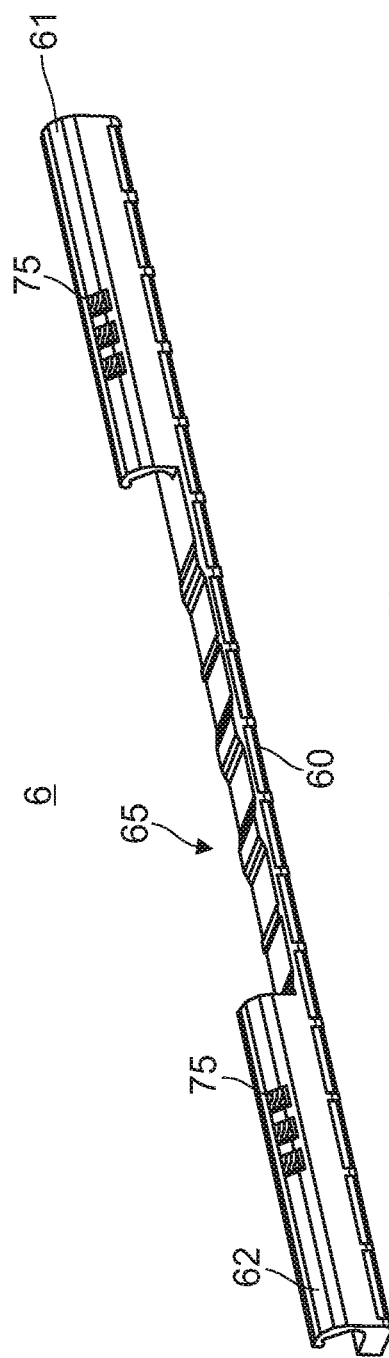

ADJUSTING DEVICE FOR LONGITUDINAL ADJUSTMENT OF A VEHICLE SEAT AND METHOD FOR MANUFACTURING THE SAME

FIELD OF INVENTION

The present invention relates to an adjusting device for longitudinal adjustment of a vehicle seat, particularly of a motor vehicle seat, to a friction-reducing device for use in such an adjusting device and methods for manufacturing the same.

BACKGROUND

Such a longitudinal adjusting device comprises two rail assemblies disposed in parallel with each other, each rail assembly having a fixed lower rail, which is fixed to a bottom of the car body, and an upper rail that is adjustable and guided in the longitudinal direction along the lower rail. Both the first rail and the second rail have a U-shaped cross section with lateral extensions and are mated to each other. Between the upper rails and the lower rails two bearing areas are formed, in each of which a respective linear guide is disposed, particularly as the direct result of the corresponding design of opposite portions of the upper and lower rails in the bearing areas. The vehicle seat is mounted to the two upper rails that are adjustable and guided in the longitudinal direction along the lower rails and can be secured in their positions with respect to the lower rails.

Conventional adjusting devices as outlined above will use bearing members, such as balls or rollers, in a respective linear guide, for reducing friction between the rails. Conventionally, these balls or rollers are accommodated in pockets or recesses of a roller cage or retainer made of a plastic material. A little grease usually needs to be added to these pockets or recesses to ensure a proper long-time operation of the adjusting device.

Current roller cages or retainers require an injection molding tool for manufacturing. Various travel requirements, upper rail and lower rail length requirements etc. drive different tools for each program. Tools for low volume production and prototypes are costly. Tolerance variation of the rails are inevitable for a number of reasons. For instance, the upper and lower rails are usually manufactured by punching and stamping from a metal sheet material. As the conditions during punching and stamping may vary as well as the positioning of the metal sheet material relative to the processing tools, this will result in variations in the dimensions of the upper and lower rails. Another reason is that usually additional components, such as a locking device for locking the longitudinal position of the upper rail, is usually fixed to the upper rail by welding. The heat applied during welding may add to the variations in the dimensions of the upper and lower rails. All these variations create high track efforts required for moving the upper rail relative to the lower rail.

Such variations may also result in other drawbacks. For instance, so-called 'popping noise' may occur when adjusting the longitudinal position of the vehicle seat, resulting in decreased acoustic performance of the adjustment device, which should be avoided.

The afore-mentioned tolerance variations of the rails cannot be compensated by an injection molding tool used for manufacturing, because the dimensions and characteristics of the molds of the injection molding tool are necessarily fixed and cannot be changed during a running production.

The afore-mentioned roller cages or retainers require bearings that require additional assembly steps, resulting in higher costs. Usually, grease is required for all such track assemblies, which might spoil the interior of a car or might result in the agglomeration of dirt on running tracks of the rails in the long-run. Applying a proper amount of grease to such track assemblies implies an additional step during assembly, adding to the total costs for manufacturing.

US 2004 084926 A1 discloses a rail assembly as outlined above, which tries to avoid the mounting of additional roller cages or retainers by applying coatings of a friction-reducing material directly on respectively opposite inner surfaces of the upper and lower rails. This friction-reducing material may be polytetrafluoroethylene or may be applied by nitriding portions of these inner surfaces.

In the market, there exists a continuous need for adjusting devices for longitudinal adjustment of a vehicle seat which can be adjusted conveniently with proper adjusting forces and at reduced wear and can be manufactured at low costs.

SUMMARY OF INVENTION

According to a first aspect of the present invention there is provided a method for manufacturing an adjusting device for longitudinal adjustment of a vehicle seat, comprising: a step of providing a first rail and a second rail each having a U-shaped cross section with lateral extensions and mated to each other, and a step of providing a friction-reducing member made of plastic material, and a step of assembling the first rail, second rail and friction-reducing member to form the adjusting device. The step of assembling the first rail, second rail and friction-reducing member to form the adjusting device comprises: combining the first rail and second rail to form a linear guide extending in a longitudinal direction and disposed between the first rail and the second rail in a bearing area, and disposing the friction-reducing member in the bearing area for reducing friction between the first and second rail, so that the second rail is movably guided in the longitudinal direction relative to the first rail with reduced friction. According to the present invention the friction-reducing member is manufactured using additive manufacturing in the step of providing the friction-reducing member.

By using additive manufacturing, the investment of designing an injection molding tool with mold forms of suitable dimensions and accuracy conventionally used can be saved. Using additive manufacturing for producing the friction-reducing member enables to manufacture the adjusting device with even enhanced precision, particularly with more precise dimensions that can be adjusted easily and precisely to the specific dimensions of the other components of the adjusting device, such as the upper and lower rail. Thus, the manufacturing of the adjusting device becomes more flexible.

Furthermore, if the manufacturing process shall be shifted to use of upper and lower rails with different dimensions and configuration, the method according to the present invention can be shifted equally well to a step of providing the friction-reducing member made of plastic material of different dimensions and configuration in correspondence to the different dimensions and configuration of the newly used upper and lower rails. In contrast to conventional manufacturing methods, this does not require the design of different molds for injection molding.

As the friction-reducing member as a 3D-printed part will not exhibit injector marks or part lines like injection molding parts, also other characteristics of the adjusting device according to the present invention will be enhanced. An important advantage is for example, that 'popping noise' that usually is generated when adjusting the longitudinal position of the vehicle seat can be avoided, resulting in a significantly reduced acoustic performance of the adjustment device of the present invention. Also, the visual inspection of the 3D-printed friction-reducing member according to the present invention is easier and more reliable.

Thus, the track assembly of the adjusting device according to the present invention can operate even without use of conventional bearing members, such as rollers or balls, because a smooth, low-friction slidability of the upper rail relative to the lower rail can be accomplished only by means of the low-friction friction-reducing member disposed in the bearing areas between the first and second rail.

The friction pairing between the plastic material of the friction-reducing member and the metal sheet material of the opposite upper and lower rails is preferably optimized in order to accomplish a friction as low as possible. Accordingly, preferred materials of the friction-reducing member may be for example solid lubricant mixtures using mainly molybdenum disulphide, graphite and PTFE or products like Berucoat MC® of CARL BECHEM GmbH.

According to a further embodiment, the plastic material includes a friction-reducing material, for reducing friction of the additively manufactured friction-reducing member at the at least one of the outer surfaces of the friction-reducing member. Due to the high flexibility offered by additive manufacturing or 3D-printing, the friction-reducing material may also be provided at certain portions of the friction-reducing member only, particularly at portions that are most relevant for defining the friction between surfaces of the friction-reducing member and the opposite inner surface of the upper or lower rail, namely the contact portions between the friction-reducing member and the upper and lower rail.

According to a further embodiment, at least those surfaces of the friction-reducing member that face the inner surface of the upper or lower rail, may be formed, at least in sections, as a planar surface without pockets or recesses to further reduce friction. Thus, a uniform, low-friction contact between the friction-reducing member and the inner surface of the upper or lower rail may be accomplished over extended areas.

According to a further embodiment, the step of additive manufacturing the friction-reducing member may include a feedback loop in which dimensions of the friction-reducing member are adjusted based on characteristics measured for the first and second rail, such as dimensions and configuration of the upper and lower rail. Thus, the dimensions of the friction-reducing member can be adjusted easily and precisely to the specific dimensions of the other components of the adjusting device, such as the upper and lower rail. Thus, the manufacturing of the adjusting device becomes more precise and more flexible.

According to a further embodiment, dimensions of the friction-reducing member are adjusted based on at least one of the following measured characteristics of the first and second rail: measurements of dimensions of the first rail and second rail after stamping out of a metal sheet material; measurements of dimensions of the first rail and second rail after welding additional components to the second rail; measurements of forces required for moving the second rail relative to the first rail after assembly of the adjusting device; acoustic characteristics measured while moving the second rail relative to the first rail after assembly of the adjusting device; travel range of the second rail relative to the first rail after assembly of the adjusting device. Thus, the friction-reducing member can be produced with even higher precision regarding dimensions and configuration thereof, which enables a smooth operation and low sliding efforts when adjusting the longitudinal position of the vehicle seat.

A further related aspect of the present invention linked by the same unitary concept and inventive idea relates to an adjusting device for longitudinal adjustment of a vehicle seat including an additively manufactured friction-reducing member as outlined above, which is made of plastic material using additive manufacturing.

A further related aspect of the present invention linked by the same unitary concept and inventive idea relates to a method for producing a friction-reducing member, wherein the friction-reducing member is produced as outlined above, made of plastic material using additive manufacturing. According to this aspect there is provided a method for producing a friction-reducing member for an adjusting device for longitudinal adjustment of a vehicle seat, said device for longitudinal adjustment comprising a first rail and a second rail, which is movably guided in a longitudinal direction relative to the first rail, wherein the first rail and second rail each have a U-shaped cross section with lateral extensions mated to each other, said method comprising: additive manufacturing the friction-reducing member of a plastic material.

According to a further embodiment, the method for producing a friction-reducing member further comprises: stamping the first and second rail of a metal sheet material; and measuring characteristics of the first and second rail; wherein the additive manufacturing includes a feedback loop in which dimensions of the friction-reducing member are adjusted based on measured characteristics of the first and second rail.

According to a further embodiment, the dimensions of the friction-reducing member are adjusted in the feedback loop based on at least one of: measurements of dimensions of the first rail and second rail after stamping out of the metal sheet material; measurements of dimensions of the first rail and second rail after welding additional components to the second rail; measurements of forces required for moving the second rail relative to the first rail after assembly of the adjusting device; acoustic characteristics measured while moving the second rail relative to the first rail after assembly of the adjusting device; travel range of the second rail relative to the first rail after assembly of the adjusting device.

A further related aspect of the present invention linked by the same unitary concept and inventive idea relates to a friction-reducing member for an adjusting device for longitudinal adjustment of a vehicle seat, said device for longitudinal adjustment comprising a first rail and a second rail, which is movably guided in a longitudinal direction relative to the first rail, wherein the first rail and second rail each have a U-shaped cross section with lateral extensions mated to each other, wherein the friction-reducing member extends in the longitudinal direction, the friction-reducing member, if viewed in the longitudinal direction, has a profile that is mated to a linear guide, which extends in the longitudinal direction and is disposed between the first rail and the second rail in a bearing area, so that the friction-reducing member can be inserted into the linear guide, and the friction-reducing member is an additively manufactured friction-reducing member made of plastic material.

According to a further embodiment, at least one of the outer surfaces of the additively manufactured friction-reducing member, which faces an inner surface of the first or second rail in the bearing area, is formed as a planar surface without pockets or recesses.

According to a further embodiment the plastic material includes a friction-reducing material, for reducing friction of the additively manufactured friction-reducing member at the at least one of the outer surfaces of the additively manufactured friction-reducing member. The friction-reducing material may be a material selected from a group comprising: polytetrafluoroethylene, ABS plastic, polylactic acid (PLA), polyamide (nylon), glass filled polyamide, epoxy resins, silver, titanium, steel, wax, photopolymers and polycarbonate.

According to a further embodiment the additively manufactured friction-reducing member further comprises at least one outer surface, which faces an inner surface of the first or second rail in the bearing area and includes pockets or recesses accommodating rollers or balls.

According to a further embodiment dimensions of the additively manufactured friction-reducing member are adjusted based on measured characteristics of the first and second rail.

According to a second aspect of the present invention linked by the same unitary concept and inventive idea there is provided an adjusting device for longitudinal adjustment of a vehicle seat comprising: a first rail and a second rail, which is movably guided in a longitudinal direction relative to the first rail, and a linear guide extending in the longitudinal direction and disposed between the first rail and the second rail in a bearing area, wherein the linear guide comprises a friction-reducing member disposed in the bearing area for reducing friction between the first and second rail, wherein the first rail and second rail each have a U-shaped cross section with lateral extensions mated to each other and the friction-reducing member is made of plastic material. According to the present invention a friction-reducing layer is provided at least partially on outer surfaces of the friction-reducing member facing an inner surface of the first or second rail in the bearing area, wherein the friction-reducing layer has a lower coefficient of friction than the plastic material, for reducing friction in the bearing area.

By specifically applying anti-friction layers or coatings to the friction-reducing member itself but not on the opposite inner surfaces of the upper and lower rail, the friction-reducing member may be provided with high precision in a separate process and delivered to the assembly line just at the time of assembling the adjusting device of its individual components. The composition, positions and dimensions of the anti-friction layers or coatings on the friction-reducing member represent additional parameters that can be used for optimizing the friction characteristics of the friction-reducing member and the performance of the whole track assembly. Particularly, the composition, positions and dimensions of the anti-friction layers or coatings on the friction-reducing member may be specifically adjusted to individual dimensions and configuration of the upper and lower rail of the track assembly.

Preferably, the anti-friction layers or coatings may be applied on the entire outer surfaces which face the upper and lower rail. Of course, the anti-friction layers or coatings may also be applied only in those sections, which are most relevant for defining friction between surfaces of the friction-reducing member and the opposite inner surface of the upper or lower rail, namely the contact portions between the friction-reducing member and upper and lower rail.

According to a further embodiment, the friction-reducing layer is made of a material selected from a group comprising: polytetrafluoroethylene (Materials such as ABS plastic, polylactic acid (PLA), polyamide (nylon), glass filled polyamide, stereolithography materials (epoxy resins), silver, titanium, steel, wax, photopolymers and polycarbonate.

According to a further embodiment, at least those surfaces of the friction-reducing member that face the inner surface of the upper or lower rail, may be formed, at least in sections, as a planar surface without pockets or recesses to further reduce friction. Thus, a uniform, low-friction contact between the friction-reducing member and the inner surface of the upper or lower rail may be accomplished over extended areas.

According to a further embodiment, the friction-reducing member may further comprise at least one outer surface, which faces an inner surface of the first or second rail in the bearing area and includes pockets or recesses accommodating rollers or balls.

According to a further embodiment, the friction-reducing member may be an additively manufactured friction-reducing member produced of the plastic material.

According to a further embodiment, dimensions of the additively manufactured friction-reducing member may be adjusted based on measured characteristics of the first and second rail as outlined above.

A further related aspect of the present invention linked by the same unitary concept and inventive idea relates to a friction-reducing member for the afore-mentioned adjusting device for longitudinal adjustment of a vehicle seat, said adjusting device comprising a first rail and a second rail, which is movably guided in a longitudinal direction relative to the first rail, wherein the first rail and second rail each have a U-shaped cross section with lateral extensions mated to each other, wherein the friction-reducing member extends in the longitudinal direction the friction-reducing member, if viewed in the longitudinal direction, has a profile that is mated to a linear guide, which extends in the longitudinal direction and is disposed between the first rail and the second rail in a bearing area, so that the friction-reducing member can be inserted into the linear guide, and wherein the friction-reducing member is made of plastic material. According to the present invention, a friction-reducing layer is provided at least partially on outer surfaces of the friction-reducing member facing an inner surface of the first or second rail in the bearing area, and the friction-reducing layer has a lower coefficient of friction than the plastic material.

According to a further embodiment, the friction-reducing layer is made of a material selected from a group comprising: polytetrafluoroethylene, ABS plastic, polylactic acid (PLA), polyamide (nylon), glass filled polyamide, epoxy resins, silver, titanium, steel, wax, photopolymers and polycarbonate.

According to a further embodiment, at least one of the outer surfaces of the friction-reducing member, which faces an inner surface of the first or second rail in the bearing area, is formed as a planar surface without pockets or recess.

According to a further embodiment, the friction-reducing member may be produced from the plastic material using additive manufacturing. The additive manufacturing may include a feedback loop in which dimensions of the friction-reducing member are adjusted based on measured characteristics of the first and second rail, as outlined above.

OVERVIEW ON DRAWINGS

Hereinafter, the invention will be described with reference to preferred exemplary embodiments and with reference to the drawings, wherein:

FIGS. 2a and 2b show a friction-reducing member according to the present invention in a perspective side view and perspective view, which is configured for use in the adjusting device for longitudinal adjustment of a vehicle seat of FIG. 1;

Figure 5:
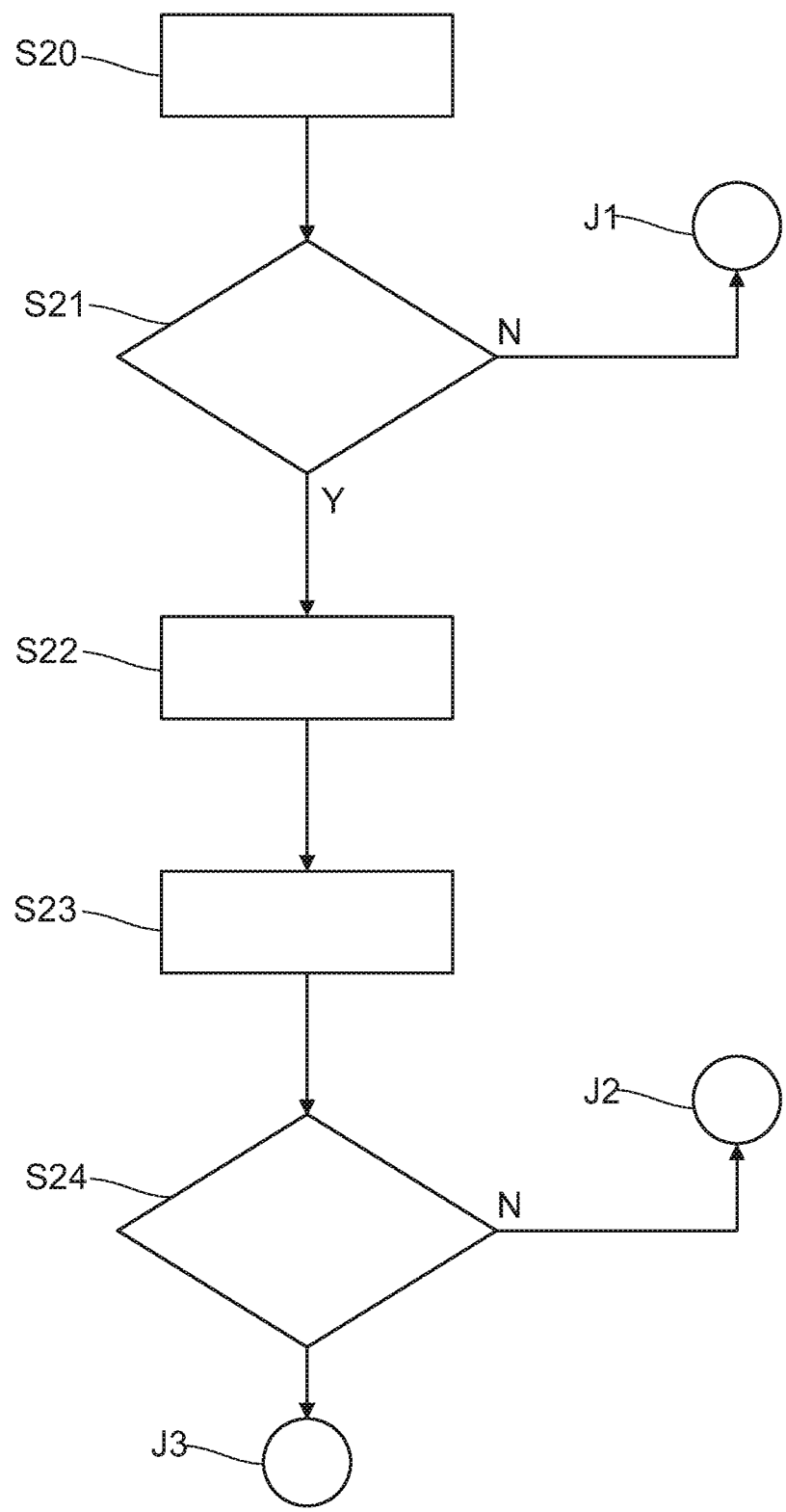
Figure 6:
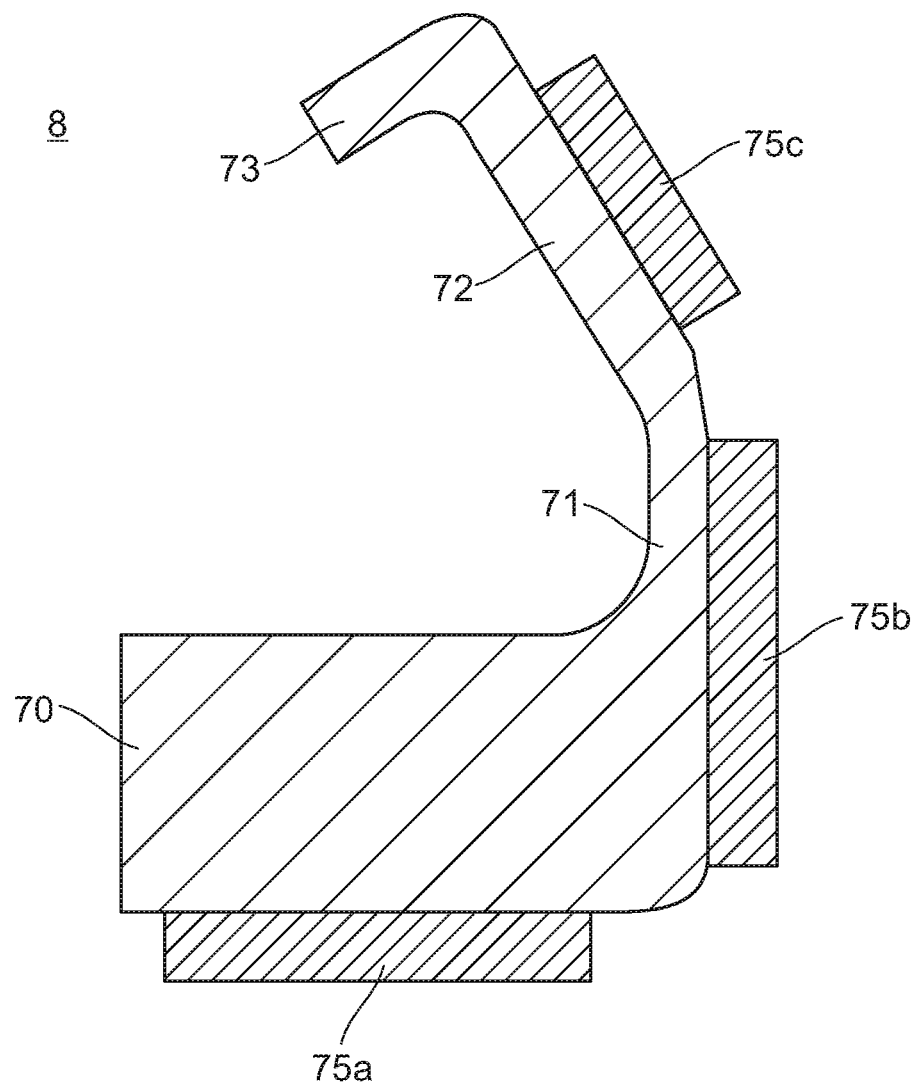

FIG. 5 is a schematic flow diagram showing further details of a feedback loop in which dimensions of the friction-reducing member are adjusted based on characteristics measured for the first and second rail; and FIG. 6 shows the configuration of a friction-reducing member for an adjusting device for longitudinal adjustment of a vehicle seat according to a second embodiment of the present invention in a cross-sectional view.

Throughout the drawings, like reference numerals designate identical or technically equivalent elements or groups of elements.

DETAILED DESCRIPTION OF PREFERRED EMBODIMENTS

Before details of the supporting of the friction-reducing member according to the present invention and of a method for manufacturing the same will be described, in the following the general geometry of an exemplary adjusting device for longitudinal adjustment of a vehicle seat will be described with reference to FIG. 1. It should be noted, however, that the following disclosure of the present invention shall not be construed to be delimited only to the particular geometry of the adjusting device shown in FIG. 1.

Figure 1:
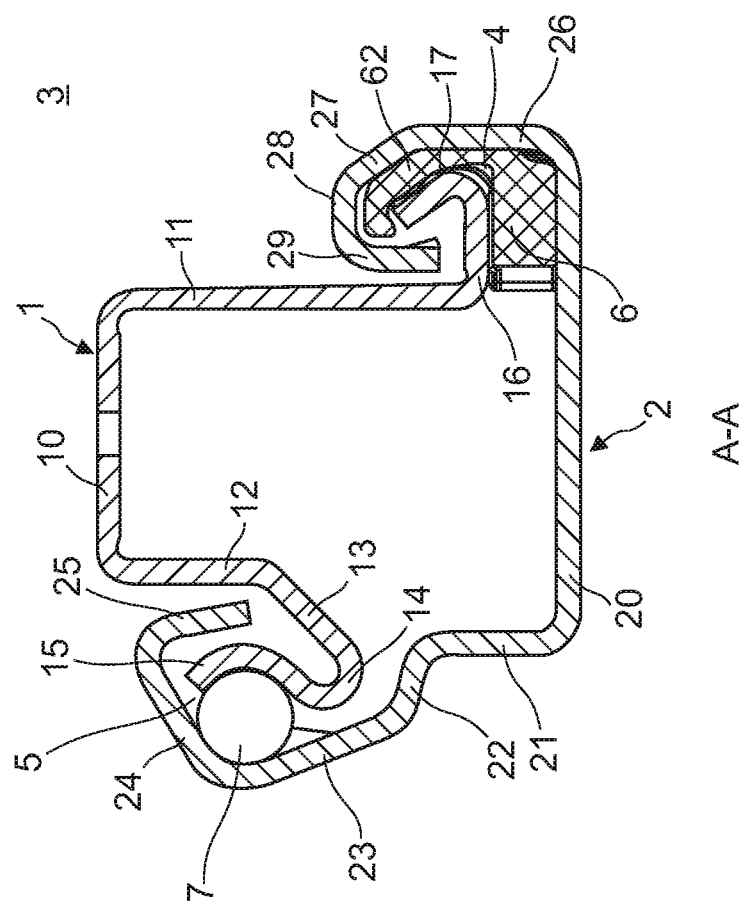
FIG. 1 shows the configuration of an adjusting device for longitudinal adjustment of a vehicle seat according to the present invention in a cross-sectional view.

As shown in FIG. 1, the adjusting device 3 for longitudinal adjustment of a vehicle seat has a substantially rectangular profile and consists of an upper rail 1 (second rail) mounted on lower rail 2 (first rail) so as to be displaceable in longitudinal direction along lower rail 2. As shown in FIG. 1, the upper rail 1 is substantially inverse U-shaped and comprises a horizontal base leg 10 (bottom) and an L-leg 11 projecting substantially perpendicularly from the base leg 10. Generally, lateral extensions of the two U-shaped rails 1, 2, such as the portions of the rails 1, 2 indicated by reference numerals 16, 17 and 36, 27, 28, 29 and by reference numerals 13, 14 and 23, 24 and 25, respectively, are mated to each other.

More specifically, the L-leg 11 is adjoined with a horizontal third connecting leg 16, which is followed by a bearing leg 17, which represents a second end portion of the upper rail 1 and extends under an acute angle upward and toward the interior of the upper rail 1. On the opposite side, a first connecting leg 12 extends substantially perpendicularly to the base leg 10 and in parallel with the opposite L-leg 11. The first connecting leg 12 is followed by a second connecting leg 13, which extends under an acute angle downward and toward the outer side of the upper rail 1. The second connecting leg 13 is followed by a bending portion 14 and a first end portion 15, which is semi-circularly curved in correspondence with the radius of curvature of a friction reducing member 7 to be supported between the first end portion 15 and a corner region formed by the two opposite legs 23, 24 of upper rail 1.

As shown in FIG. 1, lower rail 2 is substantially U-shaped and comprises a horizontal base leg 20 (bottom) and an L-leg 21 projecting substantially perpendicularly and upward from the base leg 20. The L-leg 21 is adjoined with a slanted first connecting leg 22, which extends outwards from lower rail 2, preferably inclined upward, which is followed by a second connecting leg 23, which extends under an acute angle outwards and upwards relative to base leg 20, and a third connecting leg 24, which extends under an acute angle inwards and upwards relative to base leg 20, and is finally followed by the first end portion 25, which extends downward, toward base leg 20 and into the gap between the first connecting leg 12 of upper rail 1 and the opposite first end portion 15 of upper rail 1. The friction-reducing member 7 is supported in linear guide 5 formed by the semi-circular curved end portion 15 of upper rail 1 and the opposite corner region between second connecting leg 23 and third connecting leg 24 of lower rail 2, and serves as a sliding member for reducing friction between the upper rail 1 and lower rail 2 in bearing area 5. The friction-reducing member 7 is generally of cylindrical shape and extends in longitudinal direction in bearing area 5.

On the opposite side, a fourth connecting leg 26 extends substantially perpendicularly to the base leg 20 and in parallel with the opposite L-leg 21. The fourth connecting leg 26 is followed by a fifth connecting leg 27, which extends under an acute angle upward and toward the inner side of the lower rail 2. The fifth connecting leg 27 is followed by a sixth connecting leg 28, which extends in parallel with horizontal base leg 20 and inward, and by the second end portion 29, which extends downward toward base leg 20 and into the gap between the bearing leg 17 and L-leg 11 of upper rail 1.

Thus, the end portions (lateral extensions) 25, 29 of the lower rail 2 embrace the corresponding end portions (lateral extensions) 15, 17 of the upper rail 1. The bearing areas, which are formed by opposite portions 15, 23/24 and 17, 27 of the upper rail 1 and lower rail 2, respectively, are thus diagonally offset to each other and biased against each other. Thus, linear guides 4, 5 for accommodating and supporting rolling elements are formed at the end portions of upper and lower rail 1, 2. As shown in FIG. 1, the linear guide 4 at the right-hand side in FIG. 1 is of rectangular shape and thus configured to accommodate a friction-reducing member 6 of corresponding rectangular shape, whereas the linear guide 5 at the left-hand side in FIG. 1 is of cylindrical shape and thus configured to accommodate and support a friction-reducing member 7 of corresponding cylindrical shape.

More specifically, the linear guide 4 between the two rails 1, 2 on the right-hand side of FIG. 1 is formed by respectively opposite, parallel legs of the two rails 1, 2, namely between the base leg 20 of lower rail 2 and opposite third connecting leg 16 of upper rail 1 and between the fourth and fifth connecting legs 26, 27 of lower rail 2 and opposite bearing leg 17 of upper rail 1.

More details of the friction-reducing member 6, that replaces a conventional bearing cage in an adjusting device according to the present invention, are shown in FIGS. 2a and 2b in a perspective side view and a perspective rear view.

As shown in FIGS. 2a and 2b, friction-reducing member 6 is an oblong structure, preferably of plastic material or resin, and comprises an oblong, rectangular bottom 60, which is preferably formed with a planar lower surface without any pockets or recesses conventionally used for receiving grease or lubricant and bearing members for reducing friction, such as rollers or balls. Thus, the bottom 60 is directly supported on an opposite bearing leg of the lower rail 2. Further, also the outer surfaces of the other side-walls 61, 62 disposed opposite to bearing legs of the upper or lower rail may be formed as planar surfaces without any pockets or recesses conventionally used for receiving grease or lubricant and bearing members, such as rollers or balls, for reducing friction.

As shown in FIGS. 2*a* and 2*b*, the oblong friction-reducing member 6 has a substantially L-shaped cross-section, and further comprises a rear side-wall 61 and a front side-wall 62, which project substantially perpendicular to the bottom 66. As shown in FIGS. 2*a* and 2*b*, the upper edge of the side-walls 61, 62 is inclined inward, in correspondence with the particular geometry of the rail 3 (see FIG. 1). More specifically, the rear side-wall 61 may comprise a base extending substantially perpendicular to the bottom 60 of the friction-reducing member 6, a slanted side-wall connected with the base and extending under an acute angle inward relative to the base 60 and a front end forming a free end of the slanted side-wall. The angle included between the bottom 60 of friction-reducing member 6 and the slanted side-wall corresponds to the angle included between the third connecting leg 16 (see FIG. 1) of lower rail 2 and the third connecting leg 17 of lower rail 2. Further, the front end of friction-reducing member 6 may embrace the free end of third connecting leg 17 and thus may extend into the gap between the second end portion 29 of upper rail and the third connecting leg 17 to prevent a direct contact in this bearing area. As shown in FIG. 2*a*, stiffening webs may be provided at the bottom of base to retain the angle included between the bottom 60 and base of the friction-reducing member 6, in accordance with the angle included between the base leg 20 of lower profile (see FIG. 1) and the fourth connecting leg 26 of lower rail 2.

As shown schematically in FIG. 1, in use the oblong bottom 60 of friction-reducing member 6 is disposed in the gap between base leg 20 of lower rail 2 and the third connecting leg 16 of upper rail 1, whereas the side-walls 61, 62 are mated to the shape of the gap between the upright fourth connecting leg 26 of lower rail 2 and opposite curved bottom edge of bearing leg 17 of upper rail 1 and to the shape of the gap between the slanted fifth connecting leg 27 of lower rail 2 and the slanted front end of bearing leg 17.

As shown in FIGS. 2*a* and 2*b*, a rectangular recess or window 65 may be formed in longitudinal direction between the rear side-wall 61 and front side-wall 62 of friction-reducing member 6. In general, this longitudinal recess 65 may also be omitted or may not extend over the entire height of side-walls 61, 62 of the friction-reducing member 6.

If this longitudinal recess 65 is provided, it may cooperate with an end stop additionally disposed in the gap between upper and lower rail 1, 2 and extending both through a recess formed e.g. in bearing leg 17 of upper rail 1 and through the longitudinal recess 65 of friction-reducing member 6, as disclosed particularly in the context of the cross-sectional view of FIG. 5*b* of co-pending U.S. patent application Ser. No. 14/754,841 of the Applicant "Adjusting device for longitudinal adjustment of a vehicle seat and method for assembly", filed on Jun. 30, 2016, the whole content of which is hereby expressly incorporated by reference for disclosure purposes. As disclosed in co-pending U.S. patent application Ser. No. 14/754,841 of the Applicant, by cooperation of the additional end stop with the edges of recess of bearing leg 17 and the edges of longitudinal recess 65 of friction-reducing member 6, the most forward and most backward position of upper rail 1 relative to lower rail 2 can be defined.

If the longitudinal recess 65 is not provided, the most forward and most backward position of upper rail 1 relative to lower rail 2 may also be defined in a conventional manner, e.g. using end tabs.

The lower surface of bottom 60 of the friction-reducing member 6 is preferably formed as a planar surface without conventional pockets or recesses for receiving bearings, such as rollers or balls. Preferably, also the outer surfaces of the front and rear side-wall 62, 61 of the friction-reducing member are formed as a planar surface without conventional pockets or recesses for receiving bearings, such as rollers or balls. Thus, all outer surfaces of the friction-reducing member 6 that are in contact with the opposite surfaces of the upper and lower rail, are preferably formed as planar surfaces without pockets and recesses.

However, according to further embodiments of the present invention it may be sufficient, if only one of the outer surfaces of the friction-reducing member 6, namely either the lower surface of bottom 60 or the outer surfaces of the front and rear side-walls 62, 61 are formed as planar surfaces without pockets and recesses, as shown in FIGS. 2*a* and 2*b*. More specifically, recesses for accommodating and supporting additional rollers (not shown) and/or additional balls may be provided only in the upper side-wall 61 of friction-reducing member 6 at certain positions, to absorb force components in a direction different to the vertical direction, resulting e.g. from the resolution of the force caused by the inclined bearing leg 17 in the rail profile shown in FIG. 1.

According to further embodiments, dot-like friction-reducing layers 75 may be provided on outer surfaces of the friction-reducing member 6, namely on the underside of bottom 60 and/or on the outer surfaces of the front and rear side wall 62, 61, and more preferably only on the outer surfaces of the front and rear side wall 62, 61 as shown in FIG. 1.

In the adjusting device as shown in FIG. 1, friction generally occurs in the region of the two linear guides 4, 5. More specifically, friction will be induced in the linear guide 5 between the outer surface of the cylindrical friction-reducing member 7 and the directly opposite semi-circular curved end portion 15 of upper rail 1 and the directly opposite corner region between second connecting leg 23 and third connecting leg 24 of lower rail 2, respectively. Furthermore, friction will be induced in the linear guide 4 between the outer surfaces of the L-shaped friction-reducing member 6 and the directly opposite inner surfaces of base leg 20 and the fourth connecting leg 26.

According to a first aspect of the present invention, friction is reduced in the afore-mentioned areas by specifically modifying the dimensions and geometry of the friction-reducing members 6, 7 themselves, at least in sections and in those regions, which actually get in contact with the opposite inner surfaces of the upper and lower rail 1, 2. By measuring the dimensions and geometry of the upper and lower rail 1, 2 in these regions, optionally of additional characteristics as outlined below, and by producing the friction-reducing members 6, 7 in correspondence to the measured dimensions and geometry of the upper and lower rail 1, 2, optionally additionally also in correspondence to the measured characteristics as outlined below, the sliding performance of the rail assembly may be enhanced significantly according to the present invention. Particularly, even local variations in the dimensions and geometry of the upper and lower rail 1, 2 may be compensated for by corresponding variations in the dimensions and geometry of the friction-reducing members 6, 7, namely by correspondingly modifying the dimensions and geometry of the friction-reducing members 6, 7, which may even be locally adapted to the local dimensions and geometry of the upper and lower rail 1, 2. In order to ensure such a flexible production of friction-reducing members 6, 7 with dimensions and geometry specifically adapted to the dimensions and geometry and/or measured characteristics of the upper and lower rail 1, 2, according to this first aspect of the present invention the friction-reducing members 6, 7 are additively manufactured friction-reducing members produced by additive manufacturing from a plastic material, namely by 3D-printing of plastic material. According to the present invention, the data required for additive manufacturing the friction-reducing members 6, 7 are calculated specifically on the basis of the dimensions and geometry measured for the upper and lower rail 1, 2 in the afore-mentioned regions, and/or on the basis of characteristics measured for the upper and lower rail 1, 2 as outlined below.

According to a second aspect of the present invention, friction is reduced in these areas by specifically applying a friction-reducing layer or coating on the outer surfaces of the friction-reducing member 6, 7, at least in sections and in those regions, which actually get in contact with the opposite inner surfaces of the upper and lower rail 1, 2. By measuring the dimensions and geometry of the upper and lower rail 1, 2 in these regions, optionally of additional characteristics as outlined below, and by producing the friction-reducing members 6, 7 in correspondence to the measured dimensions and geometry of the upper and lower rail 1, 2, optionally additionally also in correspondence to the measured characteristics as outlined below, the sliding performance of the rail assembly may be enhanced significantly according to the present invention. Particularly, even local variations in the dimensions and geometry of the upper and lower rail 1, 2 may be compensated for by corresponding variations in the dimensions and geometry of the friction-reducing member 6, 7, namely by correspondingly modifying the thickness of the friction-reducing layers or coatings on the outer surfaces of the friction-reducing member 6, 7, which may even be locally adapted to the local dimensions and geometry of the upper and lower rail 1, 2.

With reference to the flow diagrams of FIGS. 3 to 5 a method for manufacturing an adjusting device for longitudinal adjustment of a vehicle seat according to the present invention will be described.

Figure 4A:
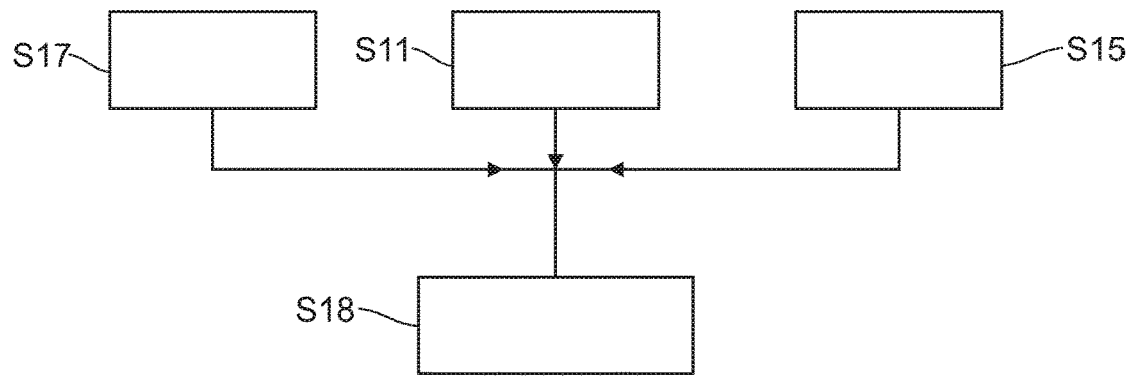
FIGS. 4a to 4c are schematic flow diagrams summarizing the main steps for assembling an adjusting device for longitudinal adjustment of a vehicle seat according to the present invention, including a feedback loop in which dimensions of the friction-reducing member are adjusted based on characteristics measured for the first and second rail.

Generally, the method starts with step S1 of providing a rail assembly as described above with reference to FIGS. 1 to 2*b*. Further details of step S1 are shown in FIG. 4*a*. In step S11 an upper rail is provided, which will usually include punching and stamping the upper rail from a metal sheet material. Although not shown in FIGS. 1 to 2*b*, a locking device may be fixed to the upper rail, which will be used for locking the longitudinal position of the upper rail relative to the lower rail. Such locking devices are generally known from the prior art so that a detailed description can be omitted. Usually, fixing the locking device to the upper rail will include welding, particularly spot welding or laser welding, a base of the locking device to the base leg of the upper rail. The heat applied during welding may result in local variations of the dimensions and geometry of the upper rails. Also other methods for fixing the locking device to the upper rail, such as screwing or riveting, may cause such variations. According to the present invention such variations in local geometry of the upper rails can be taken into account for the production of the friction-reducing members and can thus be compensated.

Generally, the method proceeds with step S15 of providing a lower rail of the configuration shown in FIGS. 1 to 2*b*, which will usually include punching and stamping the lower rail from a metal sheet material. Also punching and stamping the lower rail from a metal sheet material, which implies high forces, may cause variations in the dimensions and geometry of the lower rail. According to the present invention such variations in local geometry of the lower rails can be taken into account for the production of the friction-reducing members and can thus be compensated.

Generally, the method proceeds with step S17 of providing a friction-reducing member of the configuration discussed above with reference to FIGS. 1 to 2*b* or as shown in FIG. 6, to be discussed in the following. By designing and producing the friction-reducing member in correspondence to the dimensions and geometry individually measured for the upper and lower rail and specifically to be combined to the rail assembly, the sliding performance of the final rail assembly may be enhanced significantly according to the present invention.

In step S18 the rail assembly is mounted or assembled by combining the upper and lower rail and inserting friction-reducing members into the bearing areas, which will generally result in a rail assembly as shown e.g. in FIG. 1.

Figure 3:
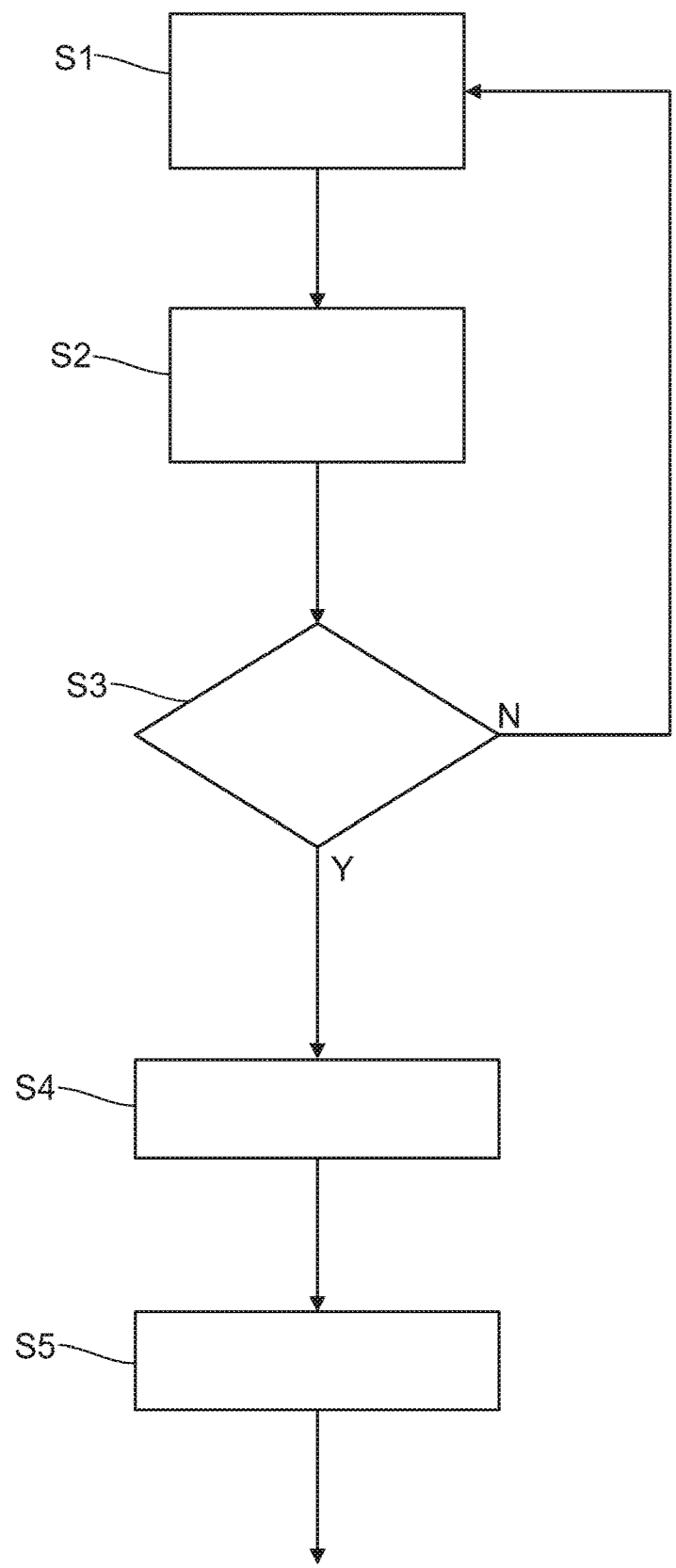
FIG. 3 is a schematic flow diagram summarizing the main steps of a feedback loop in which dimensions of the friction-reducing member are adjusted based on characteristics measured for the first and second rail.

Reverting back to FIG. 3, after step S1 the method then proceeds with step S2 of testing the rail assembly provided after assembly. Further details of step S2 will be discussed below with reference to FIG. 5. The method then proceeds with step S3, where a decision is made whether the rail assembly has successfully passed the testing procedure in step S2, or not. This decision is made on the basis of measurements of the finalized rail assembly and/or of components of this rail assembly measured before final assembly and of predetermined parameters or thresholds used for analyzing these measurements.

As an example for characteristics of the upper and lower rails, efforts or forces required for displacing the second rail relative to the first rail after assembly of the adjusting device in step S1 may be measured. If the measured efforts or forces are within predetermined upper and lower limit values, the adjusting device respectively tested will be determined as having successfully passed the testing procedure in step S2, in which case (Y) the method will proceed with step S4. On the other hand, if the measured efforts or forces are beyond predetermined upper and lower limit values, the adjusting device respectively tested will be determined as not having successfully passed the testing procedure in step S2, in which case (N) the method will return to step S1 of providing either a new rail assembly with components of modified dimensions and geometry, as outlined below, or of modifying the dimensions and geometry of components of the rail assembly currently tested in step S2, particularly of modifying the dimensions and geometry of the friction-reducing members disposed in the bearing areas of the rail assembly currently tested in step S2.

As another example for characteristics of the upper and lower rails, also acoustic characteristics of the rail assembly while moving the second rail relative to the first rail after assembly of the adjusting device in step S1 may be measured, such as the average noise generated during sliding movement or the noise generated when starting to move the second rail relative to the first rail. If the measured acoustic noise is within predetermined upper and lower limit values, the adjusting device respectively tested will be determined as having successfully passed the testing procedure in step S2, in which case (Y) the method will proceed with step S4. On the other hand, if the measured acoustic noise is beyond predetermined upper and lower limit values, the adjusting device respectively tested will be determined as not having successfully passed the testing procedure in step S2, in which case (N) the method will return to step S1 of providing either a new rail assembly with components of modified dimensions and geometry, as outlined below, or of modifying the dimensions and geometry of components of the rail assembly currently tested in step S2, particularly of the friction-reducing members disposed in the bearing areas of the rail assembly currently tested in step S2.

As another example for characteristics of the upper and lower rails, also the travel range of the second rail relative to the first rail after assembly of the adjusting device may be tested and measured. If the measured travel range is within predetermined upper and lower limit values, the adjusting device respectively tested will be determined as having successfully passed the testing procedure in step S2, in which case (Y) the method will proceed with step S4. On the other hand, if the measured travel range is beyond predetermined upper and lower limit values, the adjusting device respectively tested will be determined as not having successfully passed the testing procedure in step S2, in which case (N) the method will return to step S1 of providing either a new rail assembly with components of modified dimensions and geometry, as outlined below, or of modifying the dimensions and geometry of components of the rail assembly of the rail assembly currently tested in step S2, particularly of the friction-reducing members disposed in the bearing areas of the rail assembly currently tested in step S2.

As will become apparent to the skilled person upon studying the present application, the present invention shall not be construed to be delimited to the above measurements. Rather, also other characteristics of the rail assembly or of components thereof may be measured and analyzed. According to the present invention, the measurements may be used in a feedback loop in which dimensions of the friction-reducing member are adjusted based on measured characteristics of the first and second rail.

Particularly, the measurements may be used as the basis for modifying the dimensions of another friction-reducing member to be produced freshly and intended for use either in the rail assembly currently tested or in another rail assembly produced subsequently from other upper and lower rails.

Assuming that usually the conditions for manufacturing will vary only slowly over time, the measurements may also be averaged over a certain number of rail assemblies, e.g. over a batch of twenty, fifty or even hundred rail assemblies, and such averaged measurements may be used as the basis for modifying the dimensions of another friction-reducing member to be produced freshly and intended for use in other rail assemblies produced later from other upper and lower rails. This optional feedback to the future manufacturing of rail assemblies is schematically indicated by method step S4 in FIG. 3.

The results of the testing procedure in steps S2 and S3 may also be used for adjusting or modifying the coefficient of friction of the material or coating of friction-reducing member in method step S5, namely either of the rail assembly currently tested or of rail assemblies to be produced in the future. For instance, the upper rail may be displaced relative to the lower rail to a foremost or rearmost end position, thereby providing access at least to the front or rear end sections of the friction-reducing member. The friction characteristics of the friction-reducing member at least in these sections may then be further modified, using e.g. laser ablation, mechanical scrubbing or polishing and the like.

Further details of a feedback loop, in which dimensions of the friction-reducing member are adjusted based on measured characteristics of the first and second rail, will be described with reference to FIG. 5. In the feedback loop shown in FIG. 5 dimensions of the friction-reducing member may be adjusted based on characteristics of the first and second rail, such as dimensions or geometric configuration. These method steps may be considered as part of the testing procedure of method step S2 outlined above, but are preferably performed prior to final assembly of the adjusting device.

Figure 4B:
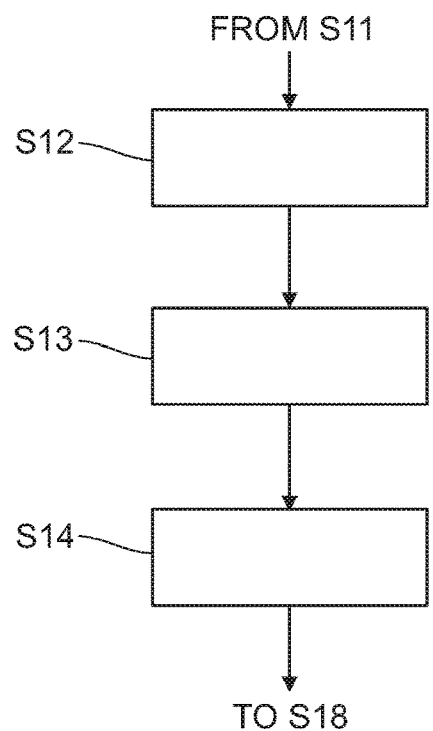

More specifically, certain characteristics of the upper and/or lower rail and/or of the friction-reducing member may be measured in step S20 before assembly of the adjusting device. Such characteristics may include measurements of the dimensions of the first rail and second rail after punching and stamping out of a metal sheet material in step S11. As shown in FIG. 4b, the method will then proceed with step S12 of measuring dimensions Xu, Yu, Zu of the upper rail provided in step S11. These dimensions may be measured as a function of the length in longitudinal direction (z) of the upper rail, but may also be averaged over sections of the upper rail or over the entire length of the upper rail. Particularly, the dimensions and geometry of those surfaces of the upper rail that will be directly opposite to surfaces of the friction-reducing member will be measured in step 12.

As an alternative, the dimensions and geometry of the upper rail may also be measured in step S14, after performing an additional step S13 of finalizing the upper rail, including an additional welding step for mounting a locking device to a base leg of the upper rail.

The characteristics and dimensions of the friction-reducing member may be adjusted directly on the basis of the dimensions and geometry measured in step S12 or S14, for producing the friction-reducing member for use in combination with the currently tested upper rail.

Figure 4C:
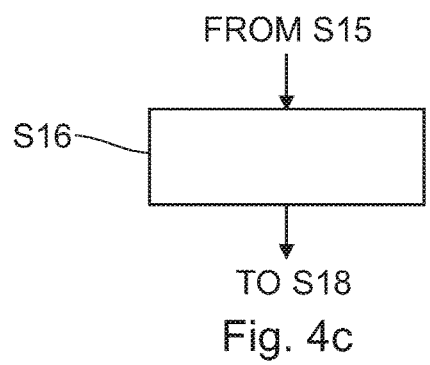

As shown in FIG. 4c, after providing the lower rail in step S15, including punching and stamping out of a metal sheet material, the method may proceed with step S16 of measuring dimensions Xl, Yl, Zl of the lower rail provided in step S15. These dimensions may be measured as a function of the length in longitudinal direction (z) of the lower rail, but may also be averaged over sections of the lower rail or over the entire length of the lower rail. Particularly, the dimensions and geometry of those surfaces of the lower rail that will be directly opposite to surfaces of the friction-reducing member will be measured in step 16.

The characteristics and dimensions of the friction-reducing member may be adjusted directly on the basis of the dimensions and geometry measured in step S16, for producing the friction-reducing member for use in combination with the currently tested lower rail.

After performing the measurement steps summarized in FIGS. 4b and 4c, the method may then proceed with step S18 of assembling the rail assembly by combining the upper and lower rail and inserting friction-reducing members into the bearing areas, which will generally result in a rail assembly as shown e.g. in FIG. 1.

If the step S20 of measuring certain characteristics of the upper and lower rail and of the friction-reducing member is performed before final assembly of the rail assembly, the process may jump back to position J1, if the test in step S21 is not successfully passed (N), in order to modify the dimensions and geometry of the friction-reducing member to bring it in better accordance with the dimensions and geometry of the upper and lower rail measured in step S20. In such a case the method may jump back to step S17 to either produce a new friction-reducing member with proper dimensions and geometry or modify the dimensions and geometry of the currently tested friction-reducing member. In the first case, the new friction-reducing member will be produced either by additive manufacturing or by applying friction-reducing layers or coatings of proper thickness on the outer surfaces of the friction-reducing member. In the second case, ablative techniques, such as laser ablation, mechanical scrubbing or polishing, of outer surfaces of the friction-reducing member or of friction-reducing layers or coatings applied on outer surfaces thereof may be employed.

On the other hand, if the test in step S21 is successfully passed (Y), the method may proceed with step S22, where the final assembling of the rail assembly is performed. After final assembly, the method may proceed with step S23 of testing the acoustic characteristics of the final rail assembly, e.g. by moving the upper rail relative to the lower rail, which may be performed and measured only once or multiple times by moving the upper rail back and forth.

After the acoustic test in step S23, the method may proceed with step S24, where it is checked whether the acoustic test has been passed (Y) or not (N). If the acoustic test is not passed (N), the method may jump back to position J2, which may be followed by one of the following: a) either the rail assembly is disassembled at least partially, for removal of the currently tested friction-reducing member and either for modifying dimensions or geometry in accordance with the dimensions or geometry of the currently measured upper and lower rail using e.g. ablative techniques, or for replacement of this friction-reducing member by a freshly produced friction-reducing member of proper dimensions or geometry in accordance with the dimensions or geometry of the currently measured upper and lower rail. This freshly produced friction-reducing member will be produced in a subsequently performed method step S17.

b) or the upper rail of the rail assembly is displaced to a foremost or rearmost end position for providing access to outer surfaces of the friction-reducing member so that the outer surfaces, or friction-reducing layers or coatings applied to these outer surfaces, may be processed to bring them in accordance with the dimensions or geometry of the currently measured upper and lower rail, e.g. by using ablative techniques, such as laser ablation, mechanical scrubbing and polishing or the like.

If also the test in step S24 is successfully passed, the method may proceed to position J3, e.g. for final customer delivery.

Referring to FIG. 6, the configuration of a friction-reducing member 8 for an adjusting device for longitudinal adjustment of a vehicle seat according to a second embodiment of the present invention will be described. The friction-reducing member 8 is formed as an oblong body, similar to the friction-reducing member 6 shown in FIGS. 2a and 2b and has a substantially L-shaped cross-section. The friction-reducing member 8 comprises a rectangular bottom or base 70 having a planar lower side. A side-wall 71 extends substantially perpendicular to the bottom 70. The friction-reducing member 8 further comprises a slanted side-wall 72 connected with the side-wall 71 and extending under an acute angle inward relative to the side-wall 71 and a front end 73 forming a free end of the slanted side-wall 72. The angle included between the side-wall 71 and the slanted side-wall 72 corresponds to the angle included between the third connecting leg 16 (see FIG. 1) of lower rail 2 and the third connecting leg 17 of lower rail 2. Further, the front end of friction-reducing member 8 may embrace the free end of third connecting leg 17 and thus may extend into the gap between the second end portion 29 of upper rail and the third connecting leg 17 to prevent a direct contact in this bearing area.

As shown in FIG. 6, friction-reducing layers or coatings 75a-75c are applied at all those portions of the friction-reducing member 8 that get in contact with opposite inner side-walls of the upper and lower rail after assembling the rail assembly. More specifically, the friction-reducing layer or coating 75a will contact the base leg 20 of the lower rail 2 in the rail assembly, friction-reducing layer or coating 75b will contact the fourth connecting leg 26 of the lower rail 2 in the rail assembly and friction-reducing layer or coating 75c will contact the fifth connecting leg 27 of the lower rail 2 in the rail assembly.

The friction-reducing layers or coatings 75a-75c may consist of polytetrafluoroethylene or other suitable materials for reducing friction in the rail assembly, such as ABS plastic, polylactic acid (PLA), polyamide (nylon), glass filled polyamide, epoxy resins, silver, titanium, steel, wax, photopolymers and polycarbonate. The friction-reducing layers or coatings 75a-75c may be applied or coated after production of the friction-reducing member 8 itself, e.g. by spray coating, spin dipping, plasma coating or the like. In this embodiment, the friction-reducing member 8 itself may be produced of a plastic material using conventional injection molding technology. In this embodiment, the exact dimensions and geometry of the friction-reducing member 8 is defined by the thickness of the friction-reducing layers or coatings 75a-75c, which may also vary locally along the length of the friction-reducing member 8, corresponding to the dimensions and geometry of the upper and lower rail measures in step S12, S14 and S16 explained above.

Varying the thickness of the friction-reducing layers or coatings 75a-75c may be accomplished by modifying the conditions while applying the friction-reducing layers or coatings 75a-75c on the outer surfaces of the friction-reducing member 8, such as duration of coating or the like. Varying the thickness of the friction-reducing layers or coatings 75a-75c may also be accomplished after applying the friction-reducing layers or coatings 75a-75c on the outer surfaces of the friction-reducing member 8. For this purpose, ablative techniques may be employed, such as laser ablation, mechanical scrubbing or polishing, of the friction-reducing layers or coatings 75a-75c. Anyway, according to the present invention the thickness of the friction-reducing layers or coatings 75a-75c is adjusted in correspondence to the dimensions and geometry of the upper and lower rail measured in step S12, S14 and S16 explained above. Varying the thickness of the friction-reducing layers or coatings 75a-75c may be accomplished easily with a precision even in the micron-range, which will be sufficient to significantly enhance the sliding performed of the rail assembly.

According to further embodiments, the thickness of the friction-reducing layers or coatings 75a-75c may be varied correspondingly even in the assembled state of the rail assembly. For this purpose, the upper rail may be displaced relative to the lower rail to a foremost or rearmost end position, thus providing access at least to the front or rear end sections of the friction-reducing member. The friction characteristics of the friction-reducing layers or coatings 75a-75c at least in these sections may then be further modified, using e.g. laser ablation, mechanical scrubbing or polishing and the like, precisely in correspondence to the dimensions and geometry of the upper and lower rail measured in step S12, S14 and S16.

As will become apparent to the skilled person upon studying the present application, according to the present invention the friction-reducing members will be individually mated to the dimensions and geometry of the upper and lower rail, which will result in an enhanced performance of the rail assembly.

As will become apparent to the skilled person upon studying the present application, the diagonally opposite linear guide 5 (see FIG. 1), which has a hollow cylindrical shape in the embodiment of FIG. 1 for supporting a cylindrical friction-reducing member, may also be replaced by a linear guide of basically rectangular shape, similar to the bottom linear guide 4 on the right-hand side of FIG. 1, which would simply require a modification of the end portions of upper and lower rail 1, 2 in this region, particularly replacement of the semi-spherically curved first end portion 15 of upper rail 1 by a linear bearing leg similar to the third connecting leg 16 and replacement of the corner region formed between the second and third connecting leg 23, 24 of lower rail 2 by a linear bearing leg similar to the base leg 20. The present invention thus also envisages embodiments having two diametrically opposite bearing areas, each being of rectangular shape similar to the bottom linear guide on the right-hand side of FIG. 1.

In comparison to conventional adjusting devices, the solution according to the present invention allows for the smoothest and lowest sliding efforts. Thus, the adjusting device for longitudinal adjustment of a vehicle seat according to the present invention offers a convenient, smooth and rattle-free longitudinal adjustment while ensuring a high mechanical strength and a much higher durability.

LIST OF REFERENCE NUMERALS 1 upper rail
2 lower rail
3 rail/adjusting device for longitudinal adjustment
4 linear guide
5 linear guide
6 friction-reducing member
7 friction-reducing member
8 friction-reducing member
10 base leg
11 L-leg
12 first connecting leg
13 second (slanted) connecting leg
14 bending portion
15 first end portion
16 third connecting leg
17 second end portion/bearing leg
20 base leg
21 L-leg
22 first (slanted) connecting leg
23 second (slanted) connecting leg
24 third connecting leg
25 first end portion
26 fourth connecting leg
27 fifth connecting leg
28 sixth connecting leg
29 second end portion
60 bottom of friction-reducing member 6
61 rear side-wall
62 front side-wall
65 longitudinal recess in side-wall 61, 62 of friction-reducing member 6
66 recess for plural types of rolling elements
70 bottom
71 base
72 slanted side-wall
73 free end
75 friction-reducing layer
75a friction-reducing layer
75b friction-reducing layer
75c friction-reducing layer
Xu, Yu, Zu dimensions of upper rail
X'u, Y'u, Z'u dimensions of finalized upper rail
Xl, Yl, Zl dimensions of lower rail p
J1 jump back no. 1
J2 jump back no. 2
J3 jump back no. 3
S1 providing rail assembly
S2 testing rail assembly
S3 rail assembly successfully test passed?
S4 providing feedback to future steps S1
S5 adjust coefficient of friction of the material or coating of friction-reducing member
S11 providing upper rail, including stamping metal sheet material
S12 measuring dimensions Xu, Yu, Zu of upper rail provided in step S11
S13 finalizing upper rail, including additional welding step
S14 measuring dimensions X'u, Y'u, Z'u of upper rail finalized in step S13
S15 providing lower rail, including stamping metal sheet material
S16 measuring dimensions Xl, Yl, Zl of lower rail provided in step S15
S17 providing friction-reducing member
S18 mounting of rail assembly
S20 measuring characteristics of upper/lower rail and/or of friction-reducing member
S21 test passed?
S22 final assembly of rail assembly
S23 acoustic test
S24 acoustic test passed?

What is claimed is:

1. A method for manufacturing an adjusting device for longitudinal adjustment of a vehicle seat, comprising:
   a step of providing a first rail and a second rail each having a U-shaped cross section with lateral extensions and mated to each other,
   a step of providing a friction-reducing member made of a plastic material, and
   a step of assembling the first rail, second rail and friction-reducing member to form the adjusting device, comprising:
      combining the first rail and second rail to form a linear guide extending in a longitudinal direction and disposed between the first rail and the second rail in a bearing area, and
      disposing the friction-reducing member in the bearing area for reducing friction between the first and second rail, so that the second rail is movably guided in the longitudinal direction relative to the first rail with reduced friction,
   wherein
   the step of providing the friction-reducing member comprises additive manufacturing the friction-reducing member of the plastic material; and wherein
   the step of providing the first rail and second rail comprises stamping the first and second rail of a metal sheet material, said method further comprising a step of measuring characteristics of the first and second rail; wherein the step of additive manufacturing the friction-reducing member includes a feedback loop in which dimensions of the friction-reducing member are adjusted based on measured characteristics of the first and second rail, comprising at least one of:

measurements of dimensions of the first rail and second rail after stamping out of a metal sheet material;

measurements of dimensions of the first rail and second rail after welding additional components to the second rail;

measurements of forces required for moving the second rail relative to the first rail after assembly of the adjusting device;

acoustic characteristics measured while moving the second rail relative to the first rail after assembly of the adjusting device;

travel range of the second rail relative to the first rail after assembly of the adjusting device.

2. The method for manufacturing an adjusting device for longitudinal adjustment of a vehicle seat as claimed in claim 1, wherein at least one of the outer surfaces of the additively manufactured friction-reducing member, which faces an inner surface of the first or second rail in the bearing area, is formed as a planar surface without pockets or recesses.

3. The method for manufacturing an adjusting device for longitudinal adjustment of a vehicle seat as claimed in claim 1, wherein in the step of additive manufacturing the friction-reducing member the plastic material includes a friction-reducing material, for reducing friction of the friction-reducing member at the at least one of the outer surfaces of the friction-reducing member.

4. The method for manufacturing an adjusting device for longitudinal adjustment of a vehicle seat as claimed in claim 3, wherein the friction-reducing material is a material selected from a group comprising: polytetrafluoroethylene, ABS plastic, polylactic acid (PLA), polyamide (nylon), glass filled polyamide, epoxy resins, silver, titanium, steel, wax, photopolymers and polycarbonate.

5. A method for manufacturing an adjusting device for longitudinal adjustment of a vehicle seat, comprising:

a step of providing a first rail and a second rail each having a U-shaped cross section with lateral extensions and mated to each other, and a step of providing a friction-reducing member made of plastic material, and a step of assembling the first rail, second rail and friction-reducing member to form the adjusting device, comprising:

combining the first rail and second rail to form a linear guide extending in a longitudinal direction and disposed between the first rail and the second rail in a bearing area, and disposing the friction-reducing member in the bearing area for reducing friction between the first and second rail, so that the second rail is movably guided in the longitudinal direction relative to the first rail with reduced friction, wherein in the step of providing the friction-reducing member the friction-reducing member is provided by injection molding of plastic material, and a friction-reducing layer is applied at least partially on outer surfaces of the friction-reducing member facing an inner surface of the first or second rail in the bearing area, wherein the friction-reducing layer has a lower coefficient of friction than the plastic material.

6. The method for manufacturing an adjusting device as claimed in claim 5, further comprising:

stamping the first and second rail of a metal sheet material; and measuring characteristics of the first and second rail; wherein the step of providing the friction-reducing member includes a feedback loop in which dimensions of the friction-reducing layer are adjusted based on measured characteristics of the first and second rail.

7. The method for manufacturing an adjusting device as claimed in claim 6, wherein dimensions of the friction-reducing layer are adjusted in the feedback loop based on at least one of:

measurements of dimensions of the first rail and second rail after stamping out of a metal sheet material;

measurements of dimensions of the first rail and second rail after welding additional components to the second rail;

measurements of forces required for moving the second rail relative to the first rail after assembly of the adjusting device;

acoustic characteristics measured while moving the second rail relative to the first rail after assembly of the adjusting device;

travel range of the second rail relative to the first rail after assembly of the adjusting device.

8. The method for manufacturing an adjusting device as claimed in claim 5, wherein in the step of providing the friction-reducing member by injection molding of plastic material at least one of the outer surfaces of the friction-reducing member, which faces an inner surface of the first or second rail in the bearing area, is formed as a planar surface without pockets or recesses.

9. The method for manufacturing an adjusting device as claimed in claim 8, wherein the plastic material includes a friction-reducing material, for reducing friction of the additively manufactured friction-reducing member at the at least one of the outer surfaces of the additively manufactured friction-reducing member.

10. The method for manufacturing an adjusting device as claimed in claim 8, wherein the friction-reducing material is a material selected from a group comprising: polytetrafluoroethylene, ABS plastic, polylactic acid (PLA), polyamide (nylon), glass filled polyamide, epoxy resins, silver, titanium, steel, wax, photopolymers and polycarbonate.

11. The method for manufacturing an adjusting device as claimed in claim 5, wherein in the step of providing the friction-reducing member by injection molding of plastic material the at least one outer surface, which faces an inner surface of the first or second rail in the bearing area, is formed to additionally include pockets or recesses accommodating rollers or balls.

12. An adjusting device for longitudinal adjustment of a vehicle seat, comprising:

a first rail and a second rail, which is movably guided in a longitudinal direction relative to the first rail, and a linear guide extending in the longitudinal direction and disposed between the first rail and the second rail in a bearing area, wherein the first rail and second rail each have a U-shaped cross section with lateral extensions mated to each other, the linear guide comprises a friction-reducing member disposed in the bearing area for reducing friction between the first and second rail, wherein the friction-reducing member is a member of plastic material formed by injection molding, and a friction-reducing layer is provided at least partially on outer surfaces of the friction-reducing member facing an inner surface of the first or second rail in the bearing area, wherein the friction-reducing layer has a lower coefficient of friction than the plastic material.

13. The adjusting device for longitudinal adjustment of a vehicle seat as claimed in claim 12, wherein at least one of the outer surfaces of the friction-reducing member, which faces an inner surface of the first or second rail in the bearing area, is formed as a planar surface without pockets or recesses.

14. The adjusting device for longitudinal adjustment of a vehicle seat as claimed in claim 12, wherein the plastic material includes a friction-reducing material, for reducing friction of the additively manufactured friction-reducing member at the at least one of the outer surfaces of the friction-reducing member.

15. The adjusting device for longitudinal adjustment of a vehicle seat as claimed in claim 14, wherein the friction-reducing material is a material selected from a group comprising: polytetrafluoroethylene, ABS plastic, polylactic acid (PLA), polyamide (nylon), glass filled polyamide, epoxy resins, silver, titanium, steel, wax, photopolymers and polycarbonate.

16. The adjusting device for longitudinal adjustment of a vehicle seat as claimed in claim 12, wherein the friction-reducing member further comprises at least one outer surface, which faces an inner surface of the first or second rail in the bearing area and includes pockets or recesses accommodating rollers or balls.

* * * * *